(12) United States Patent
Takatsuki (10) Patent No.: US 6,396,642 B2
(45) Date of Patent: May 28, 2002

(54) WIDE-ANGLE ZOOM LENS

(75) Inventor: Akiko Takatsuki, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/766,847

(22) Filed: Jan. 23, 2001

(30) Foreign Application Priority Data

Jan. 25, 2000 (JP) ........................................ 2000-015429

(51) Int. Cl.$^7$ ................................................ G02B 15/14
(52) U.S. Cl. ........................................ 359/680; 359/689
(58) Field of Search .......................... 359/689, 680–382, 359/683, 676

(56) References Cited

U.S. PATENT DOCUMENTS 5,278,698 A * 1/1994 Iizuka et al. ................ 359/682
6,246,529 B1 * 6/2001 Sensui ........................ 359/680

FOREIGN PATENT DOCUMENTS

| JP | 1-189622 | * | 7/1989 |
| JP | 4-114116 | | 4/1992 |
| JP | 10-39214 | | 2/1998 |

* cited by examiner

*Primary Examiner*—Jordan M. Schwartz
(74) *Attorney, Agent, or Firm*—Arnold International; Bruce Y. Arnold (57) ABSTRACT

A wide-angle zoom lens is provided having only three lens groups of, in order from the object side, negative, positive, and positive refractive power, respectively. The fist lens group is formed of only two lens elements, each of negative refractive power. The wide-angle zoom lens is compact and achieves high optical performance over the entire range of zoom by satisfying predetermined conditions. When power is varied during zooming, the first lens group and the second lens group are moved along the optical axis, and the third lens group remains in a fixed position. During focusing, the first lens group is moved along the optical axis.

6 Claims, 8 Drawing Sheets

Embodiment 1

Spherical Aberration (mm)
Fig. 5A

Astigmatism (mm)
Fig. 5B

Distortion
Fig. 5C

Spherical Aberration (mm)
Fig. 5D

Astigmatism (mm)
Fig. 5E

Distortion
Fig. 5F

Spherical Aberration (mm)
Fig. 5G

Astigmatism (mm)
Fig. 5H

Distortion
Fig. 5I

Spherical Aberration (mm)
Fig. 6A

Astigmatism (mm)
Fig. 6B

Distortion
Fig. 6C

Spherical Aberration (mm)
Fig. 6D

Astigmatism (mm)
Fig. 6E

Distortion
Fig. 6F

Spherical Aberration (mm)
Fig. 6G

Astigmatism (mm)
Fig. 6H

Distortion
Fig. 6I

Spherical Aberration (mm)
Fig. 7A

Astigmatism (mm)
Fig. 7B

Distortion
Fig. 7C

Spherical Aberration (mm)
Fig. 7D

Astigmatism (mm)
Fig. 7E

Distortion
Fig. 7F

Spherical Aberration (mm)
Fig. 7G

Astigmatism (mm)
Fig. 7H

Distortion
Fig. 7I

Fig. 8A Spherical Aberration (mm)

Fig. 8B Astigmatism (mm)

Fig. 8C Distortion

Fig. 8D Spherical Aberration (mm)

Fig. 8E Astigmatism (mm)

Fig. 8F Distortion

Fig. 8G Spherical Aberration (mm)

Fig. 8H Astigmatism (mm)

Fig. 8I Distortion

WIDE-ANGLE ZOOM LENS

BACKGROUND OF THE INVENTION

Zoom lenses in which negative, positive and positive lens groups are arranged in this order from an object side have been known (see, for instance, Japanese Laid-open Patent Applications H4-114116 and H10-39214).

Generally, arranging a negative lens group nearest the object side is advantageous in widening the viewing angle and, also, the back focus is easily kept sufficient using such an arrangement. On the other hand, this causes the lens system as a whole to have an asymmetrical configuration so that the fluctuation of aberrations due to zooming becomes large and it becomes difficult to obtain sufficient optical performance over the entire range of zooming.

In the above-mentioned Japanese Laid-open Patent Application H4-114116, it is described that a negative first lens group consists of a cemented negative lens element and a positive lens element. The number of lens elements is small and miniaturization is achieved. However, wide picture angles that are considered advantageous in this lens type are not provided.

Moreover, in the above-mentioned Japanese Laid-open Patent Application H10-39214, it is described that a negative first lens group consists of two negative lens elements and one positive lens element. In this configuration, the first lens group has the advantage of correcting aberrations. On the other hand, the first lens group has a relatively large outer lens diameter and consists of three lens elements. This is disadvantageous concerning miniaturization. Accordingly, it is difficult to simultaneously satisfy the desire for wider viewing angles and miniaturization.

BRIEF SUMMARY OF THE INVENTION

The present invention relates to a wide-angle zoom lens and, more particularly, it relates to a wide-angle zoom lens for use in a video camera, an electronic still camera, etc., in which a CCD is installed. The object of the present invention is to provide a wide-angle zoom lens that satisfies both the need for wider picture angles and miniaturization while exhibiting a high optical performance over the entire range of zoom.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The wide-angle zoom lens of the present invention has three lens groups of negative, positive, and positive refractive power, respectively, in order from the object side. The first lens group consists of two negative lens elements, power is varied by shifting the first lens group and the second lens group along the optical axis, and the following Conditions (1)–(3) are satisfied:

| | |
|---|---|
| $1.10 < |F_1|/Ft < 1.45$ | Condition (1) |
| $0.95 < F_2/Ft < 2.35$ | Condition (2) |
| $0.35 < m3 < 1.10$ | Condition (3) | where $F_1$ is the focal length of the first lens group; $F_2$ is the focal length of the second lens group; Ft is the focal length of the wide-angle zoom lens at the telephoto end; and m3 is the lateral magnification of the third lens group.

Moreover, it is preferable that the first lens group includes, in order from the object side, a first lens element that is a negative meniscus lens with its convex surface on the object side, and a second lens element having negative refractive power. It is also preferred that the second lens group includes four lens elements having, in order from the object side, positive, negative, positive, and positive refractive power, respectively; and that the third lens group includes three lens elements having, in order from the object side, negative, positive, and positive refractive power, respectively.

As shown in FIGS. 1–4, in each embodiment a stop 1 is arranged between the second lens group $G_2$ and the third lens group $G_3$, and a filter 2 such as an infrared-blocking filter is arranged on an image side of the third lens group $G_3$. Luminous flux which enters the first lens group $G_1$ along the optical axis from the object side is imaged at the image plane 3, at which is positioned a detecting surface of a solid-state image pickup element (e.g., a CCD).

Additionally, at the time of zooming, the first lens group $G_1$ as well as the second lens group $G_2$ move along the optical axis and the third lens group $G_3$ is fixed relative to the image plane 3. Furthermore, by moving the first lens group $G_1$ along the optical axis, focusing is performed.

The significance of Conditions (1) to (3) above will now be explained. Condition (1) sets the proper refractive power of the first lens group $G_1$, in order to minimize the generated amount of aberrations and shorten the overall length of the wide-angle zoom lens. When the refractive power of the first lens group $G_1$ becomes weak so that the ratio $|F_1|/Ft$ exceeds the upper limit, the movement of the first lens group $G_1$ during zooming from the wide angle end to the telephoto end has to be increased, thus resulting in an increase in overall length of the wide-angle zoom lens at the wide-angle end. On the other hand, when the negative refractive power of the first lens group $G_1$ becomes strong so that the ratio $|F_1|/Ft$ is below the lower limit, it becomes difficult to correct the spherical aberration generated at the first lens group $G_1$.

Condition (2) sets the proper refractive power of the second lens group $G_2$, in order to reduce the generated amount of aberrations and to shorten the overall length of the wide-angle zoom lens. When the refractive power of the second lens group becomes weak so that the ratio $F_2/Ft$ exceeds the upper limit, the movement of the second lens group $G_2$ to obtain a predetermined zoom ratio increases, so that the overall length of the wide-angle zoom lens becomes long. Moreover, since a gap between the first lens group $G_1$ and the second lens group $G_2$ increases at the wide-angle end, the lens diameter of the first lens group $G_1$ has to be enlarged so as to keep a predetermined quantity of abaxial luminous flux. Accordingly, the lens system as a whole becomes larger. On the other hand, when the positive refractive power of the second lens group $G_2$ becomes strong so that the ratio $F_2/Ft$ is below the lower limit, obtaining a sufficient back focus becomes problematic.

Condition (3) sets the proper range of magnification of the third lens group $G_3$.

When the magnification is below the lower limit, the correction of spherical aberration generated at the third lens group $G_3$ becomes difficult. On the other hand, when the magnification exceeds this upper limit, the focal length $F_2$ of the second lens group $G_2$ has to be reduced, but this is undesirable since the fluctuation of aberrations due to zooming from the wide angle end to the telephoto end becomes excessive.

Various embodiments of the present invention will now be described in detail.

EMBODIMENT 1

Figure 1:
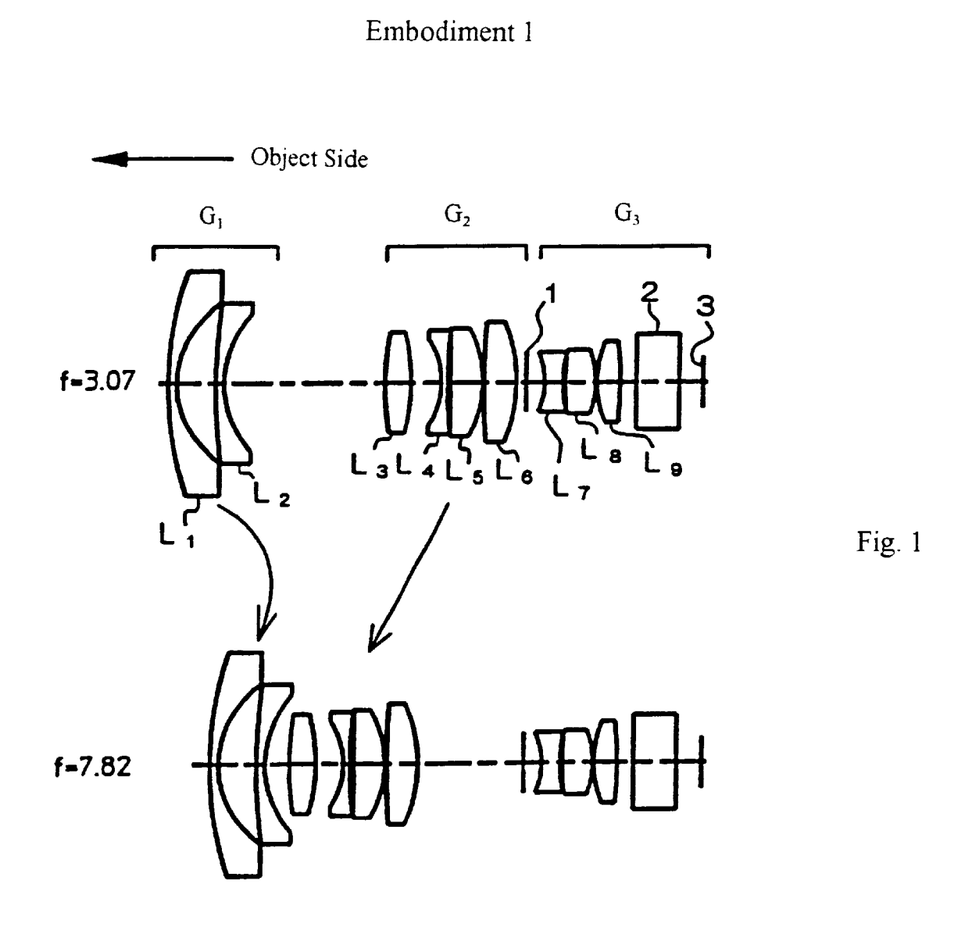
FIG. 1 shows the basic lens element configuration of a wide-angle zoom lens according to Embodiment 1 at both the wide-angle W and telephoto T end.

FIG. 1 shows the basic lens element configuration and lens group arrangement for Embodiment 1 at the wide-angle end (f=3.08 mm) as well as at the telephoto end (f=7.84 mm). The first lens group $G_1$ is formed of, in order from the object side, a first lens element $L_1$ and a second lens element $L_2$, each of which is formed of a negative meniscus lens having its convex surface on the object side. The second lens group $G_2$ is formed of, in order from the object side: a biconvex third lens element $L_3$; a biconcave fourth lens element $L_4$ having surfaces of different radii of curvature, with the surface of stronger curvature on the object side; as well as a fifth lens element $L_5$ and a sixth lens element $L_6$, each having surfaces of different curvature, with the surfaces of stronger curvature on the image side. The third lens group $G_3$ is formed of, in order from the object side: a biconcave seventh lens element $L_7$ having surfaces of different radii of curvature, with the surface of stronger curvature on the object side; a biconvex eighth lens element $L_8$ having surfaces of different radii of curvature, with the surface of stronger curvature on the image side; and a biconvex ninth lens element $L_9$ having surfaces of different radii of curvature, with the surface of stronger curvature on the object side.

Table 1 below lists the surface number # in order from the object side, the radius of curvature R (in mm) of each lens element surface, the on-axis spacing D (in mm) of the lens element surface, as well as the refractive index $N_d$ and Abbe number $\nu_d$ (at the d line) of each lens element of Embodiment 1. The middle part of the Table lists the focal length f (in mm), the $F_{NO}$), and the back focal length (in mm). The bottom part of the Table lists the focal length f at the wide-angle end, a mid-position, and the telephoto end, as well as the values of D4 and D12 (which correspond to the spacings between the lens groups $G_1,G_2$ and $G_2,G_3$, respectively).

TABLE 1

| # | R | D | $N_d$ | $\nu_d$ |
|---|---|---|---|---|
| 1 | 39.35 | 1.07 | 1.62041 | 60.3 |
| 2 | 11.08 | 4.46 | | |
| 3 | 63.39 | 1.01 | 1.74320 | 49.3 |
| 4 | 11.69 | D4 | | |
| 5 | 34.72 | 3.07 | 1.84666 | 23.8 |
| 6 | −20.86 | 3.43 | | |
| 7 | −8.79 | 0.78 | 1.84666 | 23.8 |
| 8 | 72.37 | 0.27 | | |
| 9 | 443020.91 | 3.79 | 1.74320 | 49.3 |
| 10 | −12.03 | 0.13 | | |
| 11 | 88.03 | 3.67 | 1.80610 | 40.9 |
| 12 | −16.79 | D12 | | |
| 13 | ∞ (stop) | 2.21 | | |
| 14 | −7.78 | 2.14 | 1.84666 | 23.8 |
| 15 | 19.40 | 0.22 | | |
| 16 | 33.85 | 3.60 | 1.74320 | 49.3 |
| 17 | −9.51 | 0.09 | | |
| 18 | 12.27 | 2.79 | 1.74320 | 49.3 |
| 19 | −42.03 | 0.00 | | |
| 20 | ∞ | 5.00 | 1.51633 | 64.1 |
| 21 | ∞ | | | |
| f = 3.08–7.84 | | $F_{NO}$ = 1.36–1.46 | | Bf = 4.76 |

| | WIDE | MID | TELE |
|---|---|---|---|
| f | 3.08 | 4.91 | 7.84 |
| D4 | 19.12 | 9.18 | 2.95 |
| D12 | 1.20 | 5.43 | 12.18 |

Figures 5A, 5B:
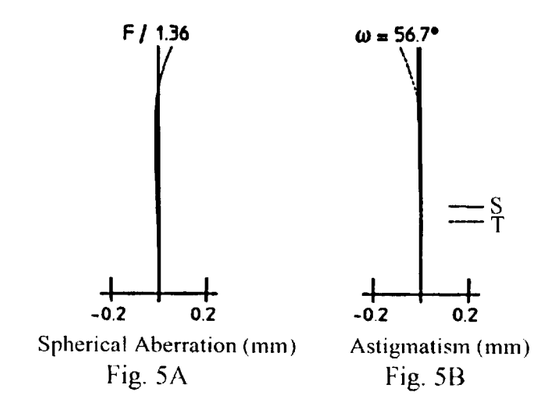
FIGS. 5A–5I are aberration figures for Embodiment 1 of the present invention, with FIGS. 5A–5C illustrating the spherical aberration, astigmatism, and distortion, respectively, at the wide-angle end, FIGS. 5D–5F illustrating the spherical aberration, astigmatism, and distortion, respectively, at the mid-position, and FIGS. 5G–5I illustrating the spherical aberration, astigmatism, and distortion, respectively, at the telephoto end.
Figure 5C:
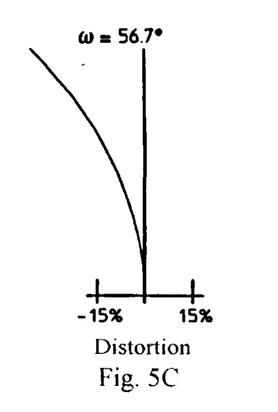
Figure 5D:
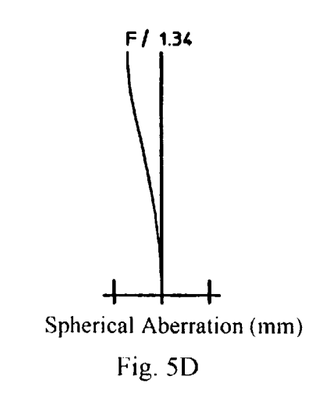
Figure 5E:
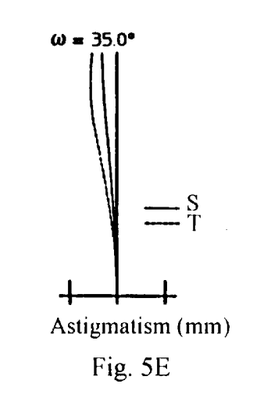
Figure 5F:
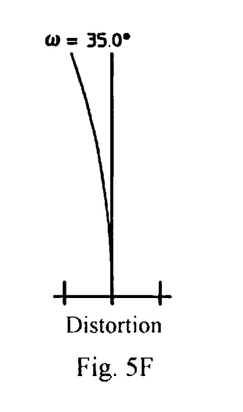
Figure 5G:
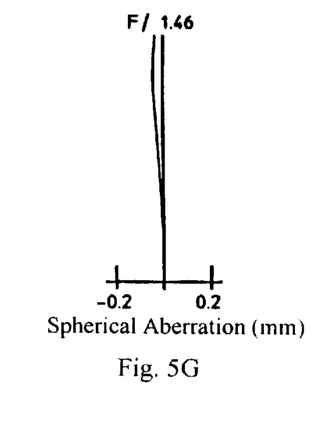
Figure 5H:
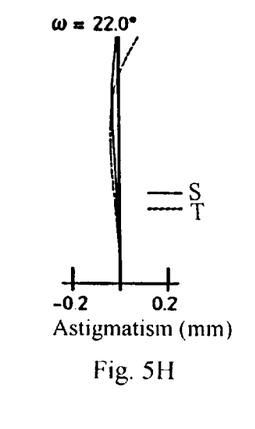
Figure 5I:
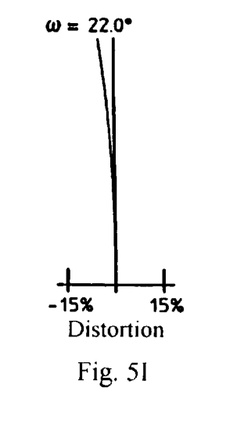

FIGS. 5A–5I show aberration figures for Embodiment 1 of the present invention, with FIGS. 5A–5C illustrating the spherical aberration, astigmatism, and distortion, respectively, at the wide-angle end (f=3.08 mm), FIGS. 5D–5F illustrating the spherical aberration, astigmatism, and distortion, respectively, at a mid-position (f=4.91 mm), and FIGS. 5G–5I illustrating the spherical aberration, astigmatism, and distortion, respectively, at the telephoto end (f=7.84 mm). In these aberration figures, ω is the half image angle, and each astigmatism figure shows this aberration in both the sagittal S and tangential T planes.

As shown in Table 1 the focal length f of the lens system as a whole is kept in the range from 3.08–7.84 mm, and the back focus is 4.76 mm. The $F_{NO}$ is in the range 1.36–1.46, which yields a very bright image. The viewing angle 2ω is a wide 113.4°. Thus, a high performance wide-angle zoom lens that favorably corrects each aberration is provided.

EMBODIMENT 2

Figure 2:
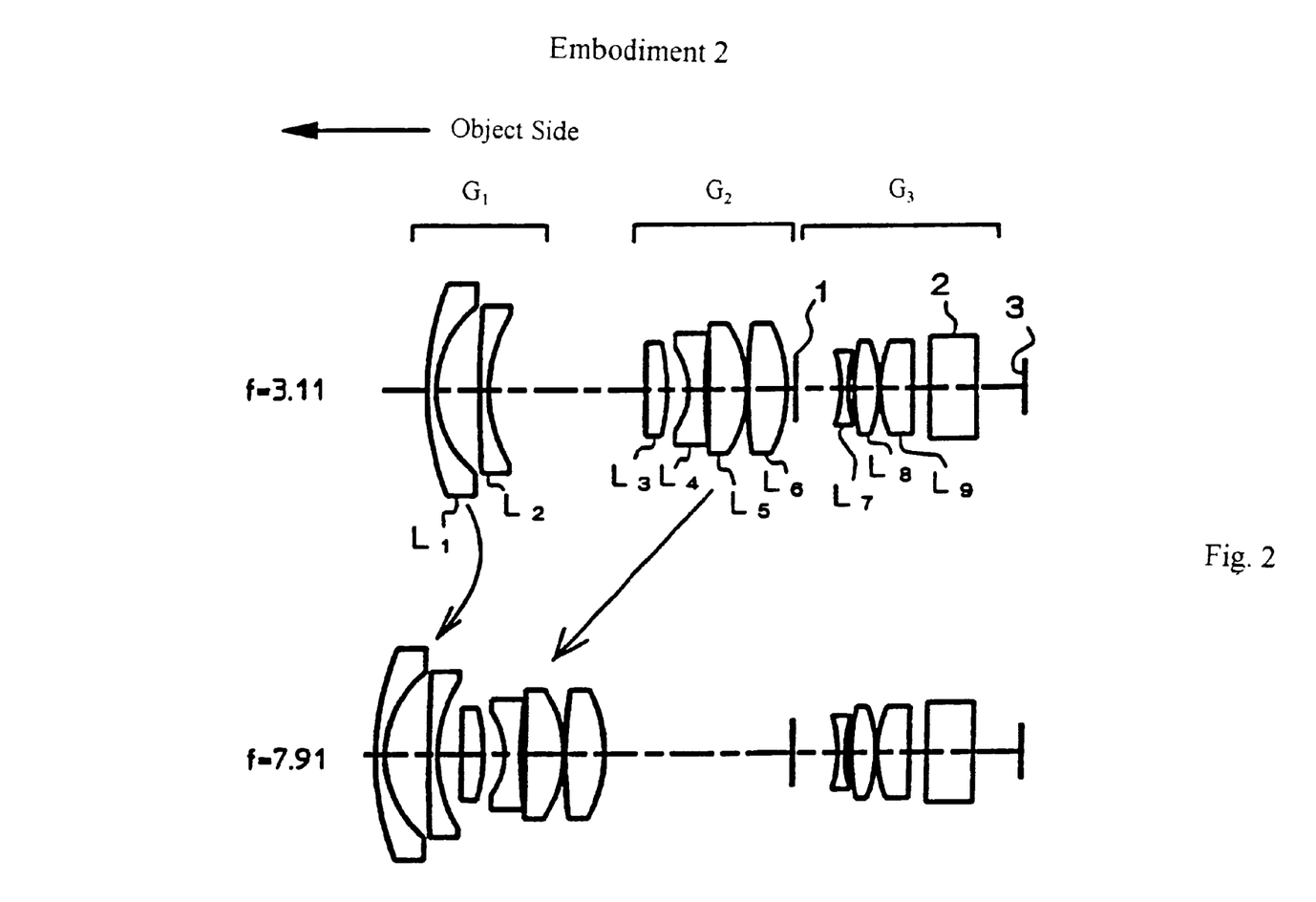
FIG. 2 shows the basic lens element configuration of a wide-angle zoom lens according to Embodiment 2 at both the wide-angle W and telephoto T end.

FIG. 2 shows the basic lens element configuration and lens group arrangement for Embodiment 2 at the wide-angle end (f=3.12 mm) as well as at the telephoto end (f=7.93 mm). The lens element configuration of Embodiment 2 is basically the same as that in Embodiment 1, except that the third lens element $L_3$ of the second lens group $G_2$ is a positive meniscus lens having its convex surface on the image side.

Table 2 below lists the surface number # in order from the object side, the radius of curvature R (in mm) of each lens element surface, the on-axis spacing D (in mm) of the lens element surface, as well as the refractive index $N_d$ and Abbe number $v_d$ (at the d line) of each lens element of Embodiment 2. The middle part of the Table lists the focal length f (in mm), the $F_{NO}$, and the back focal length (in mm). The bottom part of the Table lists the focal length f at the wide-angle end, a mid-position, and the telephoto end, as well as the values of D4 and D12 (which correspond to the spacings between the lens groups $G_1,G_2$ and $G_2,G_3$, respectively).

TABLE 2

| # | R | D | $N_d$ | $v_d$ |
|---|---|---|---|---|
| 1 | 31.42 | 1.00 | 1.75500 | 52.3 |
| 2 | 11.64 | 4.67 | | |
| 3 | 162.05 | 1.00 | 1.75500 | 52.3 |
| 4 | 15.07 | D4 | | |
| 5 | −250.26 | 2.26 | 1.84666 | 23.8 |
| 6 | −18.70 | 2.34 | | |
| 7 | −7.62 | 1.82 | 1.83400 | 37.2 |
| 8 | 47.63 | 0.40 | | |
| 9 | 3407.97 | 4.23 | 1.75500 | 52.3 |
| 10 | −12.52 | 0.10 | | |
| 11 | 54.92 | 4.33 | 1.62041 | 60.3 |
| 12 | −15.13 | D12 | | |
| 13 | ∞ (stop) | 4.83 | | |
| 14 | −13.07 | 0.80 | 1.84666 | 23.8 |
| 15 | 15.69 | 0.65 | | |
| 16 | 22.48 | 2.68 | 1.81600 | 46.6 |
| 17 | −13.70 | 0.10 | | |
| 18 | 12.93 | 3.61 | 1.75500 | 52.3 |
| 19 | −294.01 | 0.00 | | |
| 20 | ∞ | 5.00 | 1.51633 | 64.1 |
| 21 | ∞ | | | |
| f = 3.12–7.93 | | $F_{NO}$ = 1.80–1.80 | | Bf = 6.98 |

| | WIDE | MID | TELE |
|---|---|---|---|
| f | 3.12 | 4.97 | 7.93 |
| D4 | 17.12 | 8.26 | 2.64 |
| D12 | 0.96 | 8.60 | 20.81 |

Figure 6A:
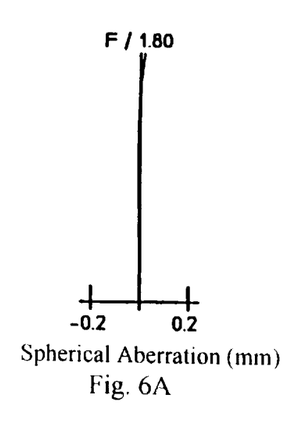
FIGS. 6A–6I are aberration figures for Embodiment 2 of the present invention, with FIGS. 6A–6C illustrating the spherical aberration, astigmatism, and distortion, respectively, at the wide-angle end, FIGS. 6D–6F illustrating the spherical aberration, astigmatism, and distortion, respectively, at the mid-position, and FIGS. 6G–6I illustrating the spherical aberration, astigmatism, and distortion, respectively, at the telephoto end.
Figure 6B:
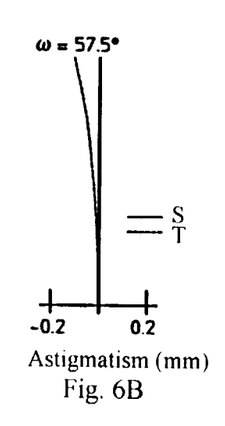
Figure 6C:
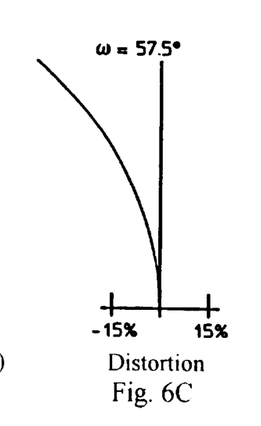
Figure 6D:
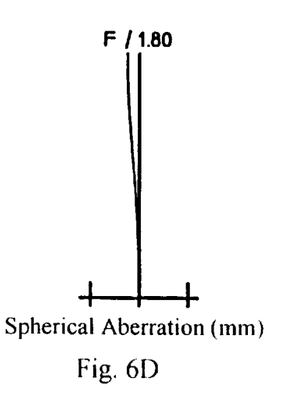
Figure 6E:
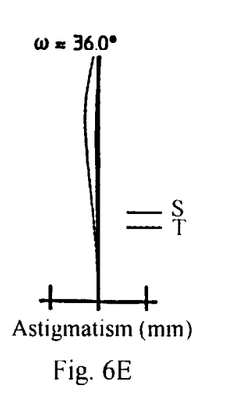
Figure 6F:
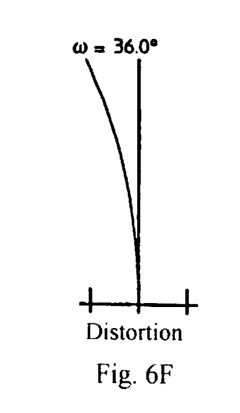
Figure 6G:
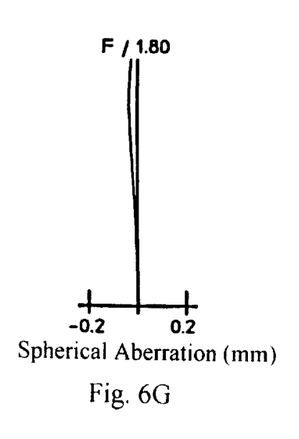
Figure 6H:
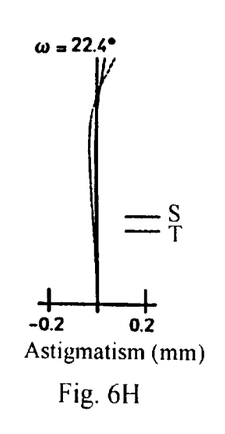
Figure 6I:
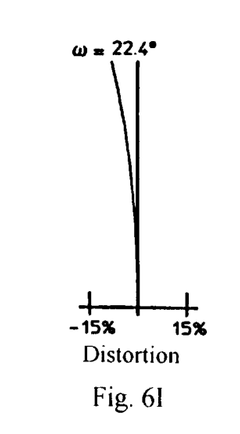

FIGS. 6A–6I show aberration figures for Embodiment 2 of the present invention, with FIGS. 6A–6C illustrating the spherical aberration, astigmatism, and distortion, respectively, at the wide-angle end (f=3.12 mm), FIGS. 6D–6F illustrating the spherical aberration, astigmatism, and distortion, respectively, at a mid-position (f=4.97 mm), and FIGS. 6G–6I illustrating the spherical aberration, astigmatism, and distortion, respectively, at the telephoto end (f=7.93 mm). In these aberration figures, ω is the half image angle, and each astigmatism figure shows the aberration in both the sagittal S and tangential T planes.

As shown in Table 2 the focal length f of the lens system as a whole is in the range 3.12–7.93 mm, and the back focus is 6.98 mm. The $F_{NO}$ is 1.80, which yields a sufficiently bright image. The viewing angle 2ω is a wide 115.0°. Thus, a high performance wide-angle zoom lens that favorably corrects each aberration is provided.

EMBODIMENT 3

Figure 3:
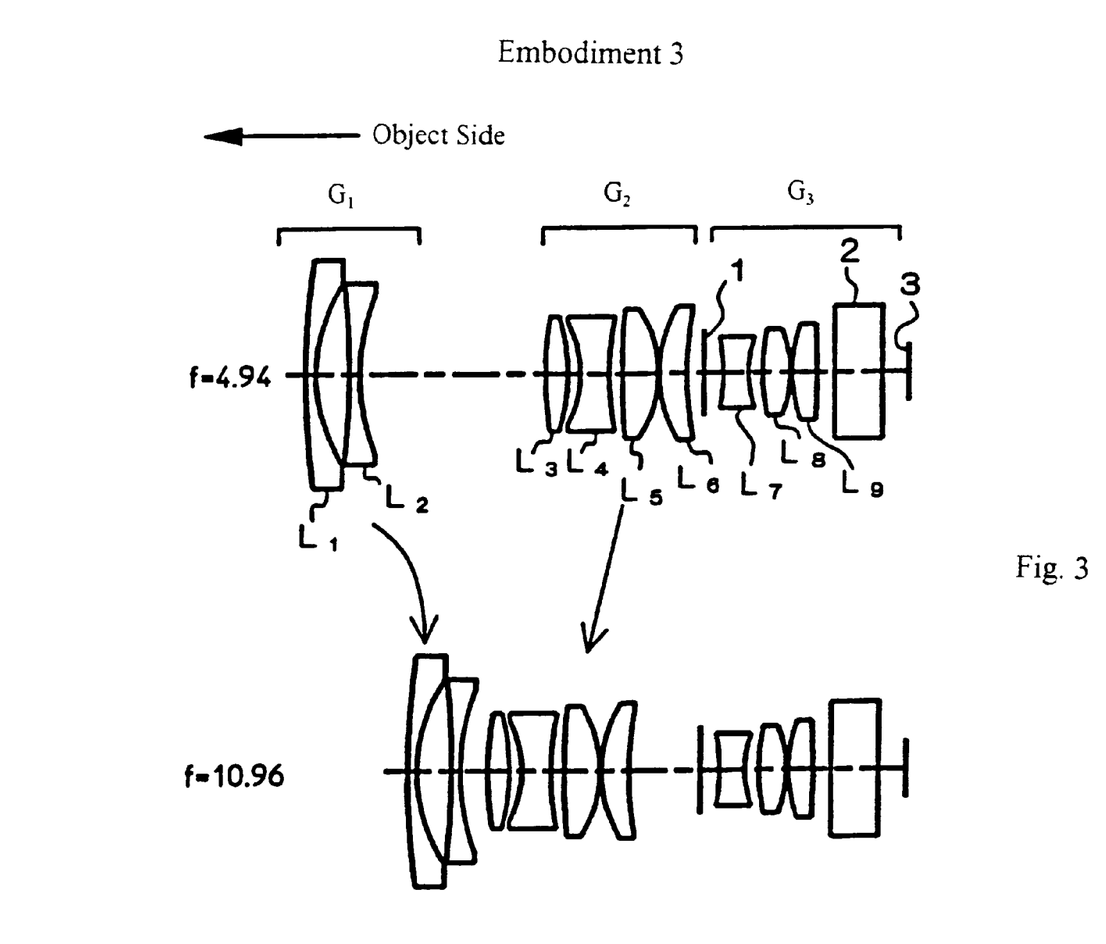
FIG. 3 shows the basic lens element configuration of a wide-angle zoom lens according to Embodiment 3 at both the wide-angle W and telephoto T end.

FIG. 3 shows the basic lens element configuration and lens group arrangement for Embodiment 3 at the wide-angle end (f=4.95 mm) as well as at the telephoto end (f=10.99 mm). The lens element configuration of Embodiment 3 is basically the same as that of Embodiment 1, except that the second lens element $L_2$ of the first lens group $G_1$ is a biconcave lens having surfaces of different curvature with the surface of stronger curvature on the image side, the sixth lens element $L_6$ of the second lens group $G_2$ is a positive meniscus lens with its convex surface on the object side, and the seventh lens element $L_7$ of the third lens group $G_3$ is a biconcave lens having surfaces of different curvature with the surface of stronger curvature on the image side.

Table 3 below lists the surface number # in order from the object side, the radius of curvature R (in mm) of each lens element surface, the on-axis spacing D (in mm) of the lens element surface, as well as the refractive index $N_d$ and Abbe number $v_d$ (at the d line) of each lens element of Embodiment 3. The middle part of the Table lists the focal length f (in mm), the $F_{NO}$, and the back focal length (in mm). The bottom part of the Table lists the focal length f at the wide-angle end, a mid-position, and the telephoto end, as well as the values of D4 and D12 (which correspond to the spacings between the lens groups $G_1,G_2$ and $G_2,G_3$, respectively).

TABLE 3

| # | R | D | $N_d$ | $v_d$ |
|---|---|---|---|---|
| 1 | 86.13 | 1.00 | 1.76056 | 51.7 |
| 2 | 17.07 | 3.55 | | |
| 3 | −92.54 | 1.00 | 1.71196 | 53.9 |
| 4 | 22.89 | D4 | | |
| 5 | 36.70 | 2.38 | 1.81823 | 25.6 |
| 6 | −20.20 | 1.36 | | |
| 7 | −10.86 | 2.97 | 1.81058 | 24.5 |
| 8 | 29.80 | 1.43 | | |
| 9 | 74.00 | 3.77 | 1.80131 | 46.3 |
| 10 | −12.58 | 0.10 | | |
| 11 | 13.28 | 2.92 | 1.80505 | 46.6 |
| 12 | 35.67 | D12 | | |
| 13 | ∞ (stop) | 2.06 | | |
| 14 | −16.25 | 2.51 | 1.76572 | 26.8 |
| 15 | 10.98 | 1.57 | | |
| 16 | 21.98 | 2.75 | 1.62906 | 55.9 |
| 17 | −11.90 | 0.20 | | |
| 18 | 14.35 | 2.64 | 1.50005 | 64.9 |
| 19 | −166.04 | 0.00 | | |
| 20 | ∞ | 5.00 | 1.51680 | 64.2 |
| 21 | ∞ | | | |
| f = 4.95–10.99 | | $F_{NO}$ = 1.59–1.77 | | Bf = 4.72 |

| | WIDE | MID | TELE |
|---|---|---|---|
| f | 4.95 | 7.92 | 10.99 |
| D4 | 19.50 | 8.15 | 2.87 |
| D12 | 1.76 | 4.57 | 7.47 |

Figure 7A:
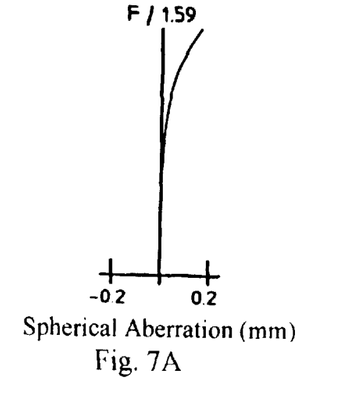
FIGS. 7A–7I are aberration figures for Embodiment 3 of the present invention, with FIGS. 7A–7C illustrating the spherical aberration, astigmatism, and distortion, respectively, at the wide-angle end, FIGS. 7D–7F illustrating the spherical aberration, astigmatism, and distortion, respectively, at the mid-position, and FIGS. 7G–7I illustrating the spherical aberration, astigmatism, and distortion, respectively, at the telephoto end.
Figures 7B, 7C:
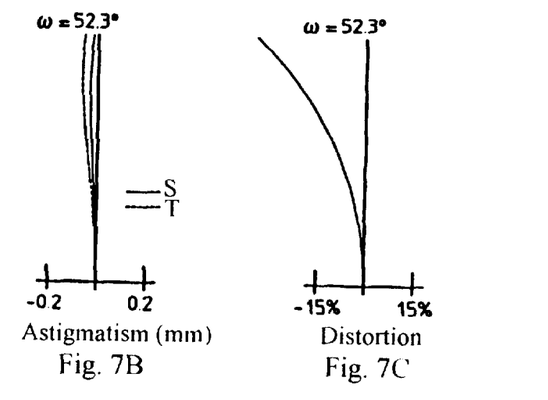
Figure 7D:
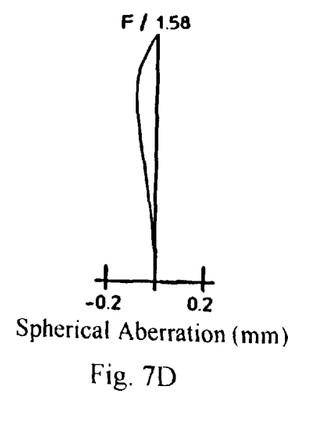
Figure 7E:
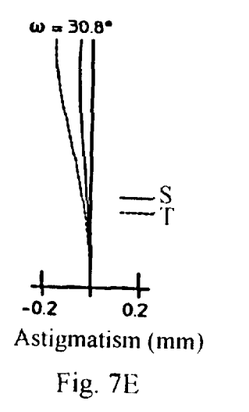
Figure 7F:
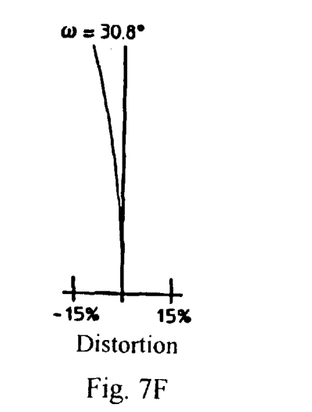
Figure 7G:
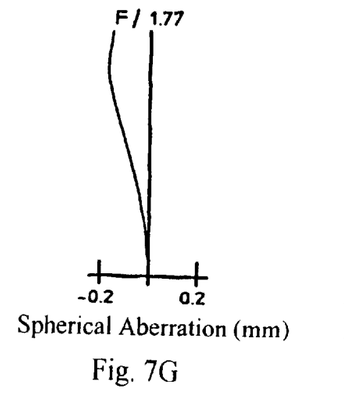
Figure 7H:
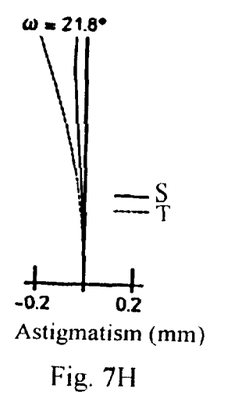
Figure 7I:
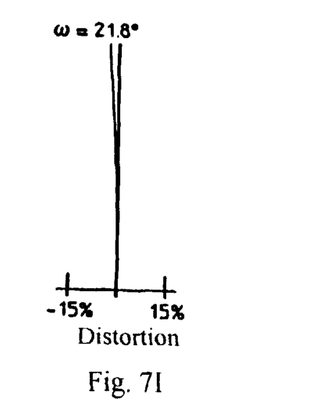

FIGS. 7A–7I show aberration figures for Embodiment 3 of the present invention, with FIGS. 7A–7C illustrating the spherical aberration, astigmatism, and distortion, respectively, at the wide-angle end (f=4.95 mm), FIGS. 7D–7F illustrating the spherical aberration, astigmatism, and distortion, respectively, at a mid-position (f=7.92 mm), and FIGS. 7G–7I illustrating the spherical aberration, astigmatism, and distortion, respectively, at the telephoto end (f=10.99 mm). In these aberration figures, ω is the half image angle, and each astigmatism figure shows the aberration in both the sagittal S and tangential T planes.

As shown in Table 3, the focal length f of the wide-angle zoom lens is in the range 4.95 to 10.99 mm, and the back focus is 4.72 mm. The $F_{NO}$ is in the range 1.59–1.77, which yields a sufficiently bright image. The viewing angle 2ω is a wide 104.6°. Thus, a high performance wide-angle zoom lens that favorably corrects each aberration is provided.

EMBODIMENT 4

Figure 4:
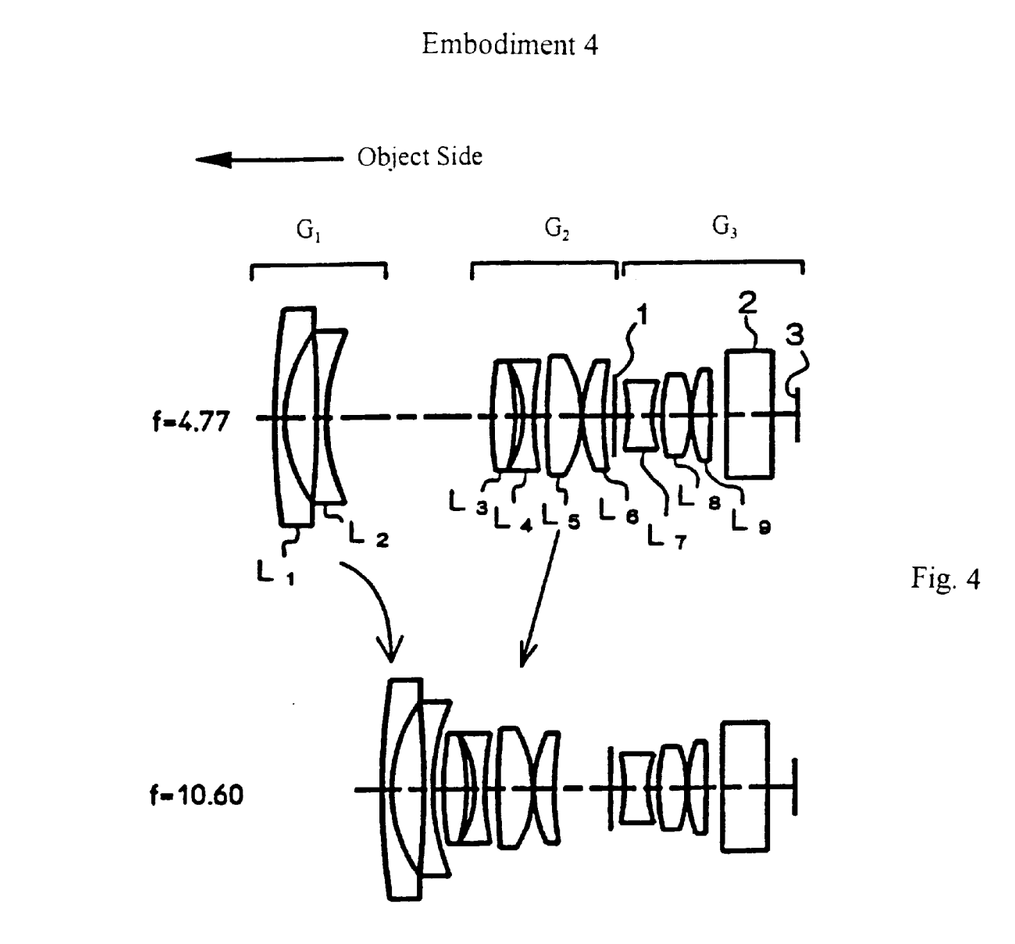
FIG. 4 shows the basic lens element configuration of a wide-angle zoom lens according to Embodiment 4 at both the wide-angle W and telephoto T end.

FIG. 4 shows the basic lens element configuration and lens group arrangement for Embodiment 4 at the wide-angle end (f=4.79 mm) as well as at the telephoto end (f=10.60 mm). The lens element configuration of Embodiment 4 is basically the same as that of Embodiment 3.

Table 4 below lists the surface number # in order from the object side, the radius of curvature R (in mm) of each lens element surface, the on-axis spacing D (in mm) of the lens element surface, as well as the refractive index $N_d$ and Abbe number $v_d$ (at the d line) of each lens element of Embodiment 4. The middle part of the Table lists the focal length f (in mm), the $F_{NO}$, and the back focal length (in mm). The bottom part of the Table lists the focal length f at the wide-angle end, a mid-position, and the telephoto end, as well as the values of D4 and D12 (which correspond to the spacings between the lens groups $G_1,G_2$ and $G_2,G_3$, respectively).

TABLE 4

| # | R | D | $N_d$ | $v_d$ |
|---|---|---|---|---|
| 1 | 80.33 | 1.06 | 1.62041 | 60.3 |
| 2 | 15.92 | 3.55 | | |
| 3 | −111.71 | 1.00 | 1.61272 | 58.7 |
| 4 | 23.88 | D4 | | |
| 5 | 38.92 | 2.56 | 1.80518 | 25.4 |
| 6 | −20.58 | 0.92 | | |
| 7 | −10.93 | 1.18 | 1.80518 | 25.4 |
| 8 | 29.97 | 1.45 | | |
| 9 | 71.64 | 3.93 | 1.81600 | 46.6 |
| 10 | −12.48 | 0.10 | | |
| 11 | 13.15 | 2.30 | 1.83481 | 42.7 |
| 12 | 35.40 | D12 | | |
| 13 | ∞ (stop) | 1.50 | | |
| 14 | −16.39 | 2.56 | 1.75520 | 27.5 |
| 15 | 11.02 | 1.18 | | |
| 16 | 22.29 | 3.10 | 1.71300 | 53.9 |
| 17 | −12.06 | 0.10 | | |
| 18 | 14.22 | 2.02 | 1.51680 | 64.2 |
| 19 | −151.52 | 0.00 | | |
| 20 | ∞ | 5.00 | 1.51680 | 64.2 |
| 21 | ∞ | | | |
| f = 4.79–10.60 | | $F_{NO}$ = 1.49–1.49 | | Bf = 4.79 |

| | WIDE | MID | TELE |
|---|---|---|---|
| f | 4.79 | 7.66 | 10.60 |
| D4 | 18.24 | 6.63 | 1.23 |
| D12 | 1.20 | 3.71 | 6.31 |

Figure 8A:
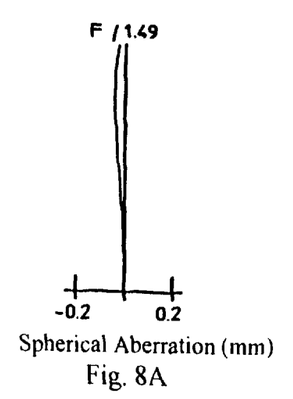
FIGS. 8A–8I are aberration figures for Embodiment 4 of the present invention, with FIGS. 8A–8C illustrating the spherical aberration, astigmatism, and distortion, respectively, at the wide-angle end, FIGS. 8D–8F illustrating the spherical aberration, astigmatism, and distortion, respectively, at the mid-position, and FIGS. 8G–8I illustrating the spherical aberration, astigmatism, and distortion, respectively, at the telephoto end.
Figure 8B:
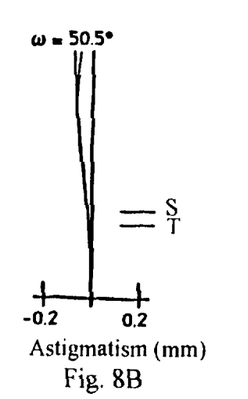
Figure 8C:
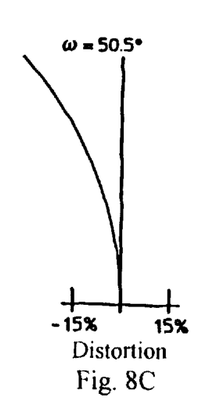
Figure 8D:
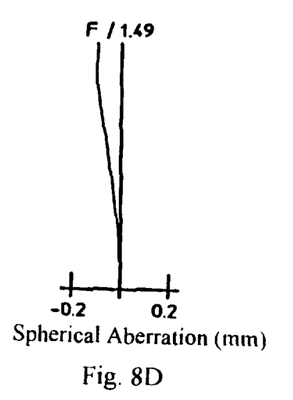
Figure 8E:
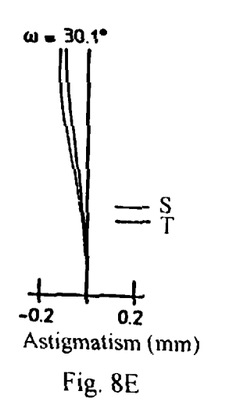
Figure 8F:
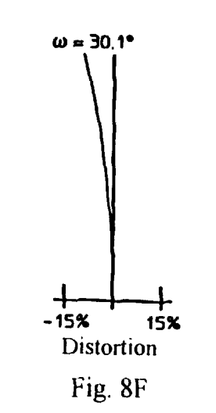
Figure 8G:
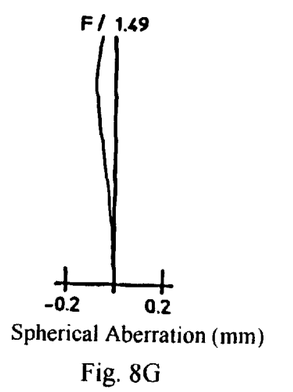
Figure 8H:
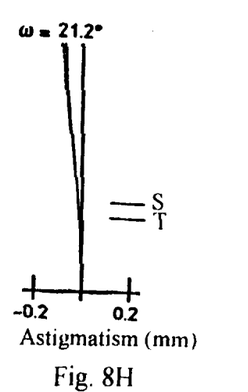
Figure 8I:
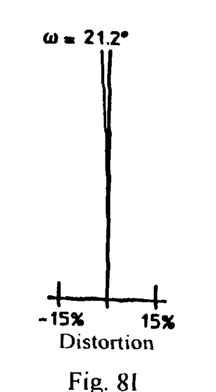

FIGS. 8A–8I show aberration figures for Embodiment 4 of the present invention, with FIGS. 8A–8C illustrating the spherical aberration, astigmatism, and distortion, respectively, at the wide-angle end (f=4.79 mm), FIGS. 8D–8F illustrating the spherical aberration, astigmatism, and distortion, respectively, at a mid-position (f=7.66 mm), and FIGS. 8G–8I illustrating the spherical aberration, astigmatism, and distortion, respectively, at the telephoto end (f=10.60 mm). In these aberration figures, ω is the half image angle, and each astigmatism figure shows the aberration in both the sagittal S and tangential T planes.

As shown in Table 4, the wide-angle zoom lens of Embodiment 4 has an overall focal length f in the range 4.79 to 10.60 mm and a back focus of 4.79 mm. The $F_{NO}$ is 1.49, which yields a sufficiently bright image. The viewing angle 2 ω is 101.0°. Thus, a high performance wide-angle zoom lens that favorably corrects each aberration is provided.

The values corresponding to Conditions (1) to (3) for each of Embodiments 1–4 are shown in Table 5.

TABLE 5

| EMBODIMENT: | 1 | 2 | 3 | 4 |
|---|---|---|---|---|
| Condition (1) | 1.26 | 1.34 | 1.14 | 1.42 |
| Condition (2) | 1.75 | 2.21 | 1.08 | 1.07 |
| Condition (3) | 0.60 | 0.40 | 1.01 | 0.86 |

As explained above, the wide-angle zoom lens relating to the present invention consists of three lens groups of negative, positive, and positive refractive power, and satisfies Conditions 1–3. Thus, a wide-angle zoom lens that has high optical performance over the entire range of zoom and is compact may be provided.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle zoom lens formed of only three lens groups having refractive power, in order from the object side, of negative, positive, and positive, respectively; wherein there are only two lens elements in the first lens group that have refractive power, and both of these lens elements have negative refractive power;

power is varied by shifting the first lens group and the second lens group along an optical axis; and the following condition is satisfied:

$$1.10 < |F_1|/Ft < 1.45$$

where $F_1$ is the focal length of the first lens group, and Ft is the focal length of the wide-angle zoom lens at the telephoto end.

2. The wide-angle zoom lens of claim 1, wherein the following condition is also satisfied:

$$0.95 < F_2/Ft < 2.35$$

where $F_2$ is a focal length of the second lens group.

3. The wide-angle zoom lens of claim 2, wherein the following condition is also satisfied:

$$0.35 - m3 < 1.10$$

and m3 is the lateral magnification of the third lens group, in order from the object side.

4. The wide-angle zoom lens according to claim 1, wherein the first of the two lens elements of the first lens group, in order from the object side, is a meniscus lens element having its convex surface on the object side.

5. The wide-angle zoom lens according to claim 1, wherein:

the second lens group includes, successively from the object side, a lens element having positive refractive power, a lens element having negative refractive power, a lens element having positive refractive power and a lens element having positive refractive power; and the third lens group includes, successively from the object side, a lens element having negative refractive power, a lens element having positive refractive power, and a lens element having positive refractive power.

6. The wide-angle zoom lens according to claim 2, wherein:

the second lens group includes, successively from the object side, a lens element having positive refractive power, a lens element having negative refractive power, a lens element having positive refractive power, and a lens element having positive refractive power; and the third lens group element includes, successively from the object side, a lens element having negative refractive power, a lens element having positive refractive power, and a lens element having positive refractive power.

* * * * *

UNITED STATES PATENT AND TRADEMARK OFFICE
CERTIFICATE OF CORRECTION

PATENT NO. : 6,396,642 B2
DATED : May 28, 2002
INVENTOR(S) : Takatsuki

It is certified that error appears in the above-identified patent and that said Letters Patent is hereby corrected as shown below:

Column 4,
Line 13, change "$F_{NO}$)," to -- $F_{NO}$, --;
Line 60, "$F_{NO}$" to -- $F_{NO}$ --;

Column 5,
Line 13, change "$F_{NO}$," to -- $F_{NO}$, --;
Line 60, change "$F_{NO}$" to -- $F_{NO}$ --;

Column 6,
Line 17, change "$F_{NO}$," to -- $F_{NO}$, --;
Line 64, change "$F_{NO}$" to -- $F_{NO}$ --;

Column 7,
Line 14, change "$F_{NO}$," to -- $F_{NO}$, --; and,
Line 62, change "$F_{NO}$" to -- $F_{NO}$ --.

Signed and Sealed this

Eighteenth Day of March, 2003

JAMES E. ROGAN
*Director of the United States Patent and Trademark Office*